June 30, 1970   R. LAGUERRE   3,518,429
DEVICE FOR PULSE SHAPE DISCRIMINATION
Filed Jan. 3, 1966   5 Sheets-Sheet 1

June 30, 1970   R. LAGUERRE   3,518,429
DEVICE FOR PULSE SHAPE DISCRIMINATION
Filed Jan. 3, 1966   5 Sheets-Sheet 2
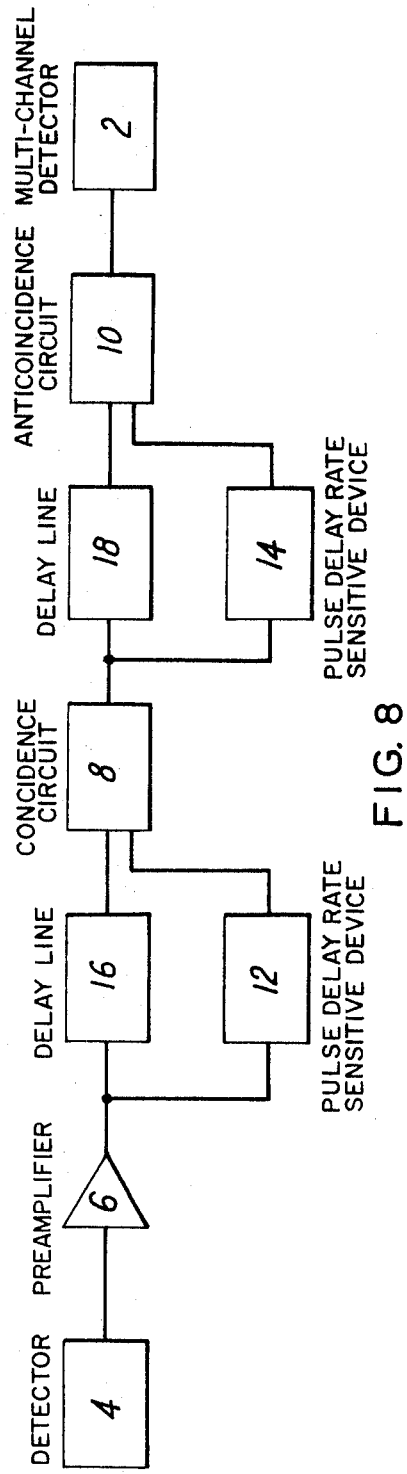
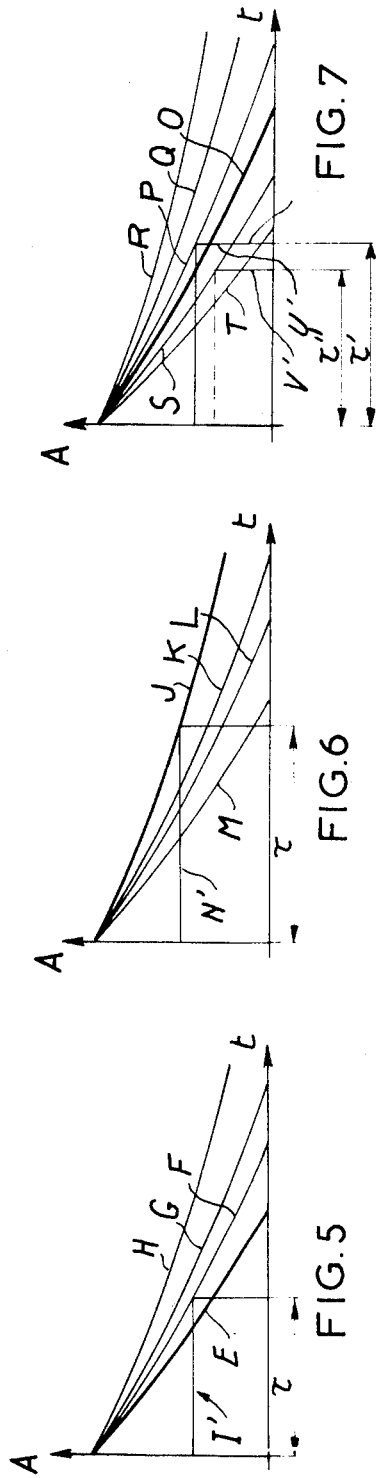

United States Patent Office 3,518,429
Patented June 30, 1970

3,518,429
DEVICE FOR PULSE SHAPE DISCRIMINATION
René Laguerre, Meudon-la-Foret, France, assignor to Commissariat a l'Energie Atomique, Paris, France
Filed Jan. 3, 1966, Ser. No. 518,314
Claims priority, application France, Jan. 12, 1965, 1,614
Int. Cl. G01t 1/20
U.S. Cl. 250—71.5
6 Claims

ABSTRACT OF THE DISCLOSURE

Pulses of a given type in a sequence of pulses are discriminated by slope in a radiation detecting device connected to a coincidence circuit with a first pulse decay rate sensitive device connected to the circuit. An anticoincidence circuit is controlled by a second pulse decay rate sensitive device. Both circuits are connected to a receiver.

---

This invention relates to a method for selecting certain pulses of a given type from a train of incident pulses having the same polarity and different pulse decay rates, the main application to which the invention is directed being a method for pulse shape discrimination which can be employed especially in nuclear engineering when it proves necessary to select from the pulses produced by a scintillation detector those pulses which correspond to the appearance of a given particle. The present invention is also concerned with a device for the practical application of said method of discrimination.

It should first of all be pointed out that the invention applies to a type of pulse of well defined shape and characterized by a raise time which can be of any duration followed by a decay stage according to a unchanging law.

One type of pulse shape discriminator which is employed for special applications is made up of two parallel channels having different time constants, wherein one channel (namely a channel which has a low time constant) collects signals derived from the anode of a photomultiplier while the other channel (namely a channel which has a high time constant) receives the signals which appear at one of the dynodes of said photomultiplier.

The slow channel produces a pulse having one polarity while the fast channel produces a pulse of opposite polarity. These pulses are added and the regulation of the amplitude of the signal derived from one of the channels makes it possible to distinguish the signal which results from the reception of a γ-photon from the signals which result from very highly ionizing particles.

Unfortunately, this unit is difficult to adjust, reacts on the detector and consequently provides unreliable results. Furthermore, its preferred field of application lies in the study of monoenergetic sources.

The different methods which form the subject of this invention as well as the device for the practical application of said methods make it possible to overcome the disadvantages which have been summarized above.

The method of selection of certain pulses of a given type from a sequence of incident pulses of identical polarity having one of several predetermined decay rates consists in superimposing on said incident pulses a square wave which has a time-duration $\tau$, a polarity which is opposite to that of said pulses and an amplitude which is equal to the amplitude of one of the types of incident pulses at the time $\tau$ after their initial instant. Any component having a polarity which is identical with that of the square wave is detected among the sequence of signals which result from the addition operation herein-above defined and the existence of said component indicates the presence of a pulse having a decay rate which is higher than a predetermined value.

It is convenient to make use of this method for the purpose of selecting certain pulses of a given type from a sequence of pulses derived from different sources. As a consequence, the essential application of the method hereinabove described is a method for the discrimination of pulse shapes. This method, in order to eliminate unwanted pulses which have a lower decay rate than that of wanted pulses, selects the wanted pulses by utilizing an auxiliary square wave having a polarity which is opposite to that of the incident pulses, the amplitude of which is equal at the time $\tau$ after their initial instant to the amplitude of that class of incident pulses which has the highest decay rate among the unwanted pulses which have a decay rate below that of the wanted pulses. The appearance of any component having a polarity which is identical with that of the auxiliary square wave is detected among the pulses which result from this addition operation, transmission of the corresponding incident pulse to a receiving device is triggered in the event of appearance of said component.

The second method eliminates from a pulse sequence any unwanted pulses having a decay rate which is higher than that of the wanted pulses. The unwanted pulses are selected by utilizing an auxiliary square wave having an amplitude which is equal to that of the wanted pulses at the time $\tau$ after their initial instant. The appearance of any component having the same polarity as the auxiliary square wave is detected among the signals which result from this addition operation. The transmission of the corresponding incident pulse to said receiving device is prevented in the event of appearance of said component.

The invention uses a unit for discriminating the shape of pulses of a given type in a sequence of incident pulses of identical polarity having one of a number of predetermined rates of decay. The pulses of a detector comprising a photomultiplier are transmitted to a receiver through a coincidence circuit in the input channels of which are respectively mounted a delay line and a first pulse decay rate sensitive device which operates according to the second method and supplies a signal having the same polarity as that of the auxiliary square wave each time an incident pulse has a decay rate which is lower than that of the wanted pulses. The pulses are also transmitted an anticoincidence circuit in the input channels of which are respectively mounted a delay line and a second pulse decay rate sensitive device which operates according to the third method and supplies a signal having the same polarity as that of the auxiliary square wave each time an incident pulse has a decay rate which is higher than that of the wanted pulses.

Each pulse shape discrimination unit comprises a channel which transmits the incident pulses to a mixer after reversal of their polarity and a second channel for producing an auxiliary square wave which is also coupled with said mixer.

The channel which produces the auxiliary square wave is a combination of two components in parallel. The first component consists of a lengthening circuit for producing a step whose amplitude defines that of the square wave which supplies a gate coupled with the mixer. The second component consists of a differentitator and a monostable multivibrator which defines the duration of the auxiliary square wave and controls the gate of said first chain.

Aside from these main arrangements, the invention has secondary arrangements which will be mentioned hereinafter and which relate especially to one embodiment of the shape discrimination unit.

The pulse shape discrimination unit in accordance with the present invention has a number of remarkable advantages. Its operation does not disturb that of the detector unit and the detector operates satisfactorily irrespective of the shape of the pulses under study. The discrimination unit is highly reliable and no counting loss is ever observed; and it can readily be transistorized.

In order that the technical characteristics of the present invention may be more readily understood, the different applications of the method of pulse shape discrimination according to the invention and a preferred embodiment of the discrimination unit for the utilization of said method will now be described. It will be understood that the description which now follows is not intended to set any limitation either on the mode of operation of the invention or on the potential uses thereof.

In the accompanying drawings:

FIG. 5 is graph which is similiar to the graph of FIG. 1 and is used to explain the procedure according to the invention for the elimination of pulses having a decay rate which is lower than that of wanted pulses;

FIG. 6 is a graph used to explain the elimination of pulses having a decay rate which is higher than that of a wanted pulse;

FIG. 7 is concerned both with the elimination of pulses having a decay rate which is lower than that of a wanted pulse and the elimination of pulses having a decay rate which is higher than that of said wanted pulse;

FIG. 8 is a block diagram of a discrimination unit which serves to transmit to a multi-channel selector those pulses which have predetermined characteristics, unwanted pulses being eliminated by means of two pulse decay rate sensitive devices;

There will now be explained first the method of selection of certain pulses of a given type from a sequence of pulses having predetermined characteristics.

Figure 1:
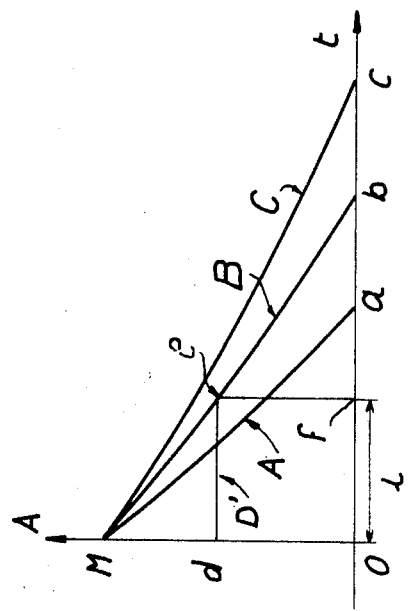
FIG. 1 is a graph which represents a number of pulses having a very short rise time and different decay rates as well as an auxiliary square wave, and is used to explain the method of selection in accordance with the present invention.

The pulses under study in this example are characterized by extremely short rise times, so that in the graph of FIG. 1, $A = f(t)$, (wherein A=amplitude and $t$=time), the leading edge of the pulses is represented by a fraction OM of the y-axis while the decay time follows an approximately exponential law, the different pulses being distinguished by different decay times corresponding to the curves $Ma$, $Mb$, $Mc$.

It will be assumed that certain pulses of a given type B are to be selected from a sequence or train of incident pulses of identical polarity A, B and C having one of a number of predetermined decay rates.

In accordance with the invention, there is superimposed on the incident pulses a square wave D having a time-duration $\tau$; having a polarity which is opposite to the polarity of the pulses; and having an amplitude which is equal to the amplitude of one of the types of pulses, in this case the pulse B, at the time $\tau$ after the initial instant O. It should be noted that, in FIG. 1, there is shown a square wave O$def$ (or square wave D') which has the same amplitude as the square wave D but opposite polarity, in order that the result of this addition operation may thus be more clearly understood.

Figure 2:
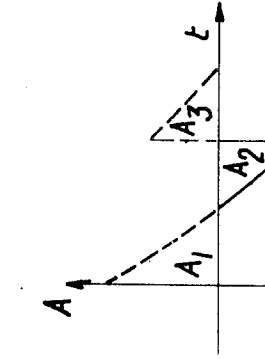

By superimposing the square wave D of negative polarity on the pulse 1, there are thus formed three pulses $A_1$, $A_2$ and $A_3$ as shown in FIG. 2; the first and third of these pulses have a positive polarity while the second pulse has a negative polarity.

Figures 3, 4:
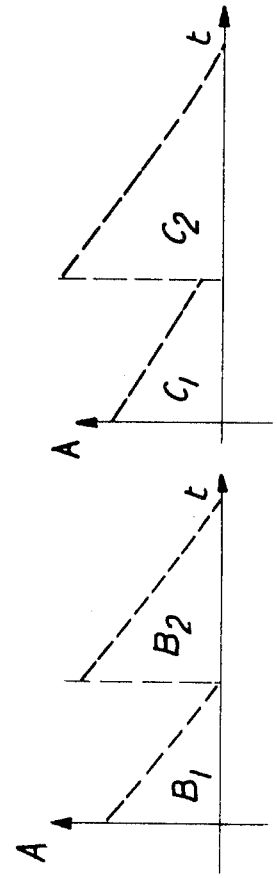
FIGS. 2, 3 and 4 show the result of the addition of an auxiliary square wave of negative polarity on each of the pulses shown in FIG. 3.

The superposition of the square wave D on the pulse B is illustrated in FIG. 3 and results in the formation of two pulses $B_1$ and $B_2$ having positive polarity.

Finally, the superposition of the square wave D on the pulse C results in the formation of two pulses $C_1$ and $C_2$ of positive polarity as shown in FIG. 4.

It can readily be visualized that the presence or absence of a pulse which has a faster decay rate than pulse B results in the existence or non-existence, among the sequence of pulses which result from the addition operation hereinabove defined, of a component having a polarity which is identical with that of the square wave, namely a negative polarity.

This method can readily be utilized for the purpose of transmitting to a unit of a given type such as a multi-channel selector, for example, only a particular type of pulses which are mixed with pulses derived from different sources. Effective discrimination of the shape of said pulses is thus achieved.

It will be assumed, for example, that the useful pulse E (as shown in FIG. 5) is mixed with pulses F, G and H which all have decay rates $p$ of lower value than the decay rate of the wanted pulse E.

The method of selection as hereinabove defined makes it necessary to superimpose on all of these pulses a square wave I having a duration $\tau$; having a polarity which is opposite to that of the pulses; and having an amplitude which is equal to that of the pulse F at the time $\tau$ after its initial instant. It should be noted that FIG. 5 shows a square wac I' having an amplitude and a duration which are equal to those of the square wave I but which have opposite polarity.

It must be pointed out that the pulse F has the highest decay rate among those unwanted pulses whose decay rate is lower than that of the pulses E.

As appears from a study of FIGS. 2, 3 and 4, the superposition of the square wave I on the different pulses E, F, G and H results in the formation of a number of triangular pulses all having positive polarity unless the incident pulse is of the type E. In this case there will be observed the presence of a pulse having negative polarity. It will therefore only be necessary to detect the formation of a pulse having negative polarity and to utilize the signal obtained for the purpose of triggering the transmission of the wanted pulse to a given unit for the purpose of eliminating the pulses F, G, H.

It is possible to transmit to a receiving unit such as a multi-channel selector only those pulses E which have the requisite characteristics and to eliminate the pulses F, G, H, the decay rate of which is too low. With this object in view, a coincidence circuit is connected in series between the detector and the receiver. Said coincidence circuit must be operated each time a pulse of negative polarity results from the addition of the auxiliary square wave I to an incident pulse. This operation of the coincidence circuit is carried out by means of a shape discriminator.

It will now be assumed that a useful pulse J (as shown in FIG. 6) is mixed with unwanted pulses K, L and M at a higher decay rate than that of the wanted pulse. The method of selection in accordance with the invention then consists in superimposing on the different pulses a square wave N which has negative polarity, a duration $\tau$ and an amplitude which is equal to the amplitude of the pulse J at the time $\tau$ after its initial instant. It should be noted that FIG. 6 shows a square wave N' having an amplitude and a duration which are equal to those of the square wave N but of opposite polarity.

From a further study of FIGS. 2, 3 and 4, it will be apparent that, in the present case, pulses of negative polarity will still be generated unless the incident pulse is of type J. In this case, it will therefore be necessary to utilize the absence of pulses of negative polarity in order to trigger the transmission of an incident pulse.

It will again be possible to transmit to a unit such as a multi-channel selector only those pulses which have the requisite characteristics while eliminating pulses which have too high a decay rate. To this end, it will be necessary to connect between the detector and the receiver and in series with the receiver an anticoincidence circuit which will be blocked by a pulse decay rate sensitive device of similar design to the type previously mentioned each time a pulse of negative polarity is detected.

FIG. 7 illustrates the case in which a useful pulse O is selected from a sequence of pulses comprising pulses which have a longer decay time (P, Q, R) as well as pulses which have a shorter decay time (S and T). It is self-evident that the combination of the two methods illustrated in FIGS. 5 and 6 eliminates both the pulses having a higher decay rate and the pulses having a lower decay rate.

A square wave U is superimposed on these pulses having a duration $\tau'$; having a polarity which is opposite to that of the pulses P, Q, R; and having an amplitude which is equal to that of the pulse P at the instant $\tau'$ after its initial instant. A square wave U' is shown having an amplitude and duration which are equal to those of the square wave U but of opposite polarity to achieve the operation illustrated in FIG. 5 so as to eliminate the unwanted pulses which have a decay rate lower than that of the wanted pulse.

Similarly, a square wave V is superimposed on the incident pulses having a duration $\tau$ and having an amplitude which is equal to that of the wanted pulse S at the instant $\tau''$ after its initial instant. The figure shows a square wave V' which has the same duration and amplitude as the square wave V but which has opposite polarity and achieves the operation illustrated in FIG. 6 so as to eliminate the unwanted pulses at decay rates which are higher than that of the wanted pulse.

The combined utilization of a coincidence circuit and an anticoincidence circuit which are connected in series with a unit for receiving only pulses of a type O eliminates any unwanted pulse provided that said circuits are respectively controlled by pulse decay rate sensitive devices which operate as explained earlier.

FIG. 8 represents a device which serves to transmit to a given unit such as a multi-channel selector 2, for example, only pulses of a given type among the pulses supplied by a detector 4 and transmitted by a preamplifier 6.

As has already been explained, a coincidence circuit 8 and an anticoincidence circuit 10 respectively controlled by pulse decay rate sensitive devices 12 and 14 are connected in series with the multi-channel selector. It should be noted that delay lines 16 and 18 are provided in the channel which comprises the coincidence circuit and anticoincidence circuit. These devices serve to retard the incident pulses, with the result that said pulses appear at the inputs of the circuits 8 and 10 at the same time as the blocking or release control signals produced by the pulse decay rate sensitive devices.

Figure 9:
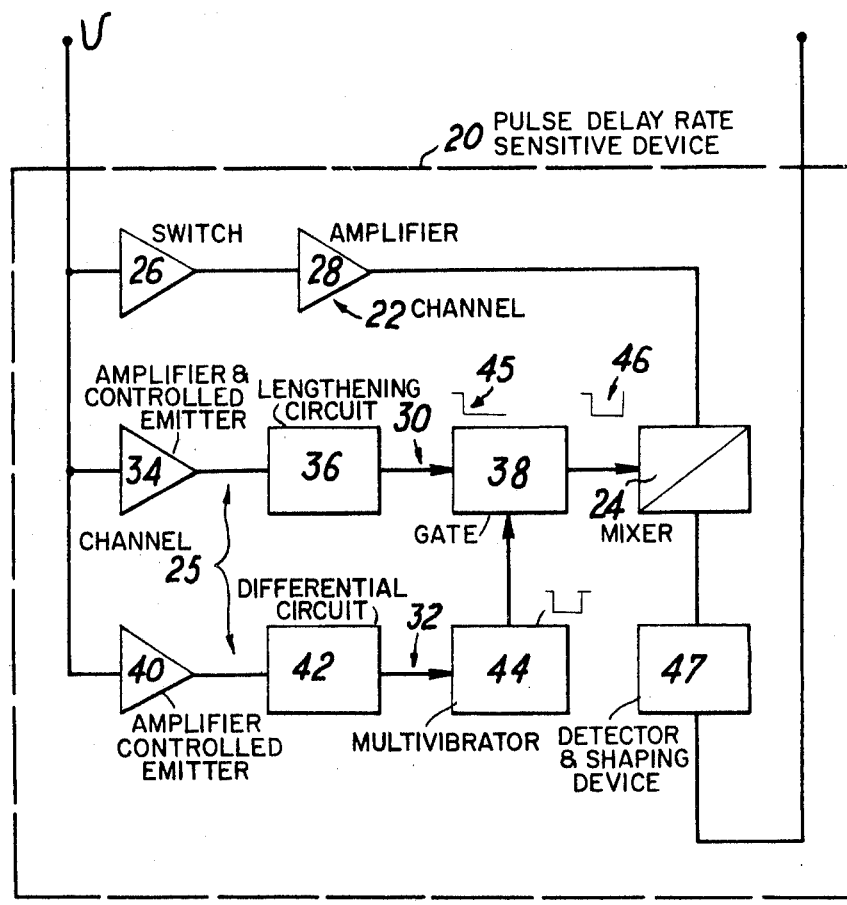
FIG. 9 is a schematic electrical diagram of a pulse decay rate sensitive device.

FIG. 9 represents a pulse decay rate sensitive device of similar type to the device 12 or 14. Said pulse decay rate sensitive device 20 comprises a chanel 22 which transmits the incident pulses to a mixer 24 after reversal of polarity of said pulses, and a second channel 25 for producing an auxiliary square wave which is also transmitted to the mixer 24 at its second input.

The channel 22 is made up of a circuit comprising a driven emitter 26 followed by an amplifier 28 having a gain which is equal to −1.

The channel which supplies the auxiliary square wave comprises two chains 30 and 32 which are connected in parallel, the first chain being made up of an amplifier and controlled emitter 34, a lengthening circuit 36 and a gate 38 which is coupled with the mixer while the second chain consists of an amplifier and controlled emitter 40, a differential circuit 42 and a monostable multivibrator 44.

The pulses supplied to the pulse decay rate sensitive device have a negative polarity, with the result that those pulses which are applied to the first input of the mixer have a positive polarity.

The auxiliary square wave 46 is produced by the gate circuit 38. The leading edge of said square wave appears at the output of the lengthening circuit 36 while the trailing edge thereof coincides with the return to the initial state of the multivibrator 44.

The signal produced by the mixer 24 is transmitted to a detection and shaping device 47 which detects the pulses of negative polarity and produces in this case a signal which drives the coincidence circuit or blocks the anticoincidence circuit.

When it is desired to select one pulse from a number of others by means of the pulse decay rate sensitive device of FIG. 9, the optimum length and amplitude of the auxiliary square wave must be determined and added to one of the two pulses, irrespective of the characteristics of the two pulses. First of all, the oscillograph images of the two pulses are compared and the duration $\tau$ of the auxiliary square wave is then deduced therefrom. Said duration must correspond to the maximum time difference between said two pulses.

The duration of the pulse produced by the multivibrator 44 is regulated by conventional means and the amplitude of the step 45 is controlled in such a manner as to cancel the pulse which has the same polarity as the square wave which corresponds to the regulating pulse. The control of the amplitude of said step is carried out, for example, by means of a potentiometer forming part of the circuit 36 which collects a variable fraction of the voltage produced by the lengthening device.

Figure 10:
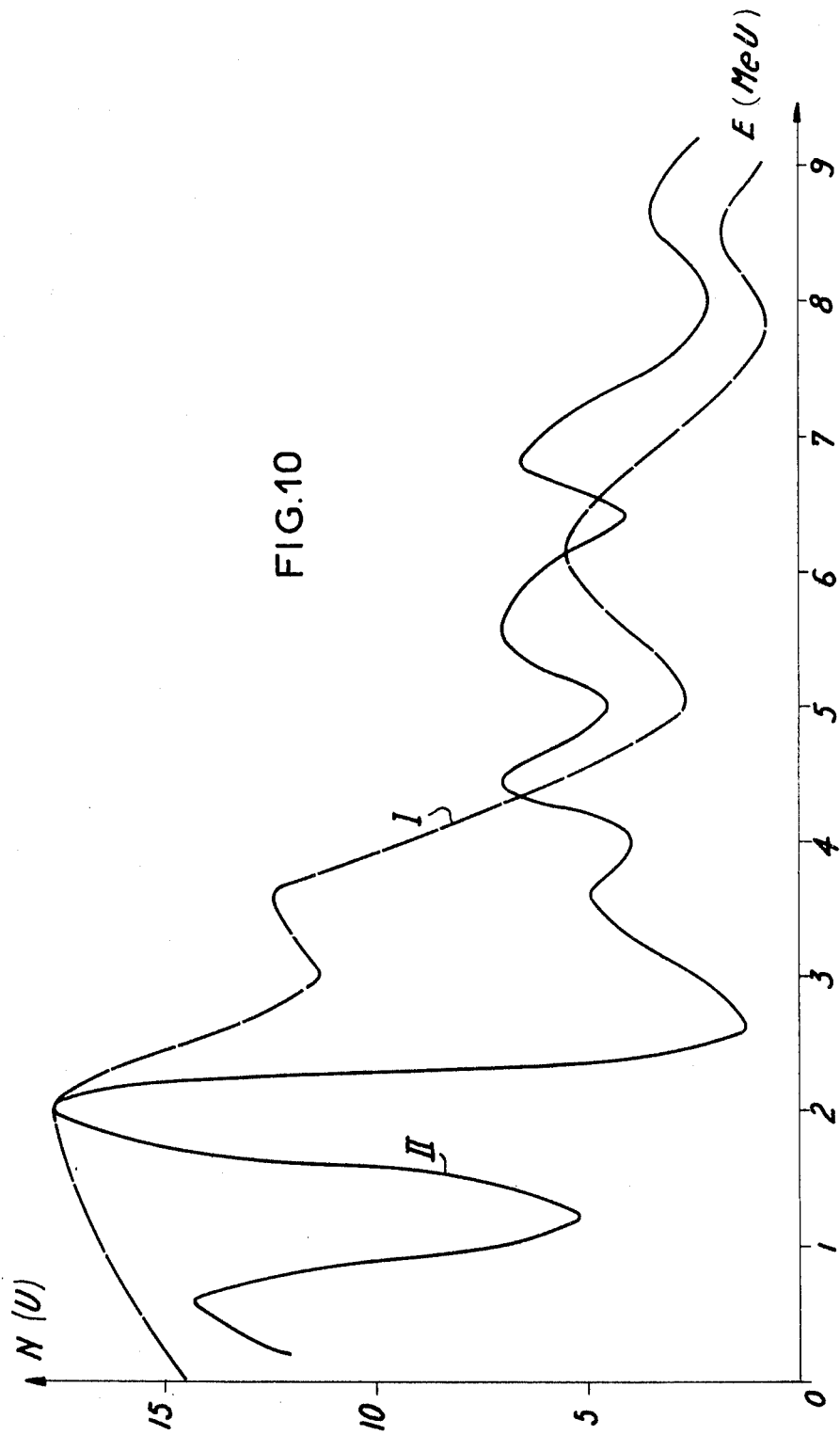
FIGS. 10 and 11 are curves showing the efficiency of the apparatus in accordance with the invention.
Figure 11:
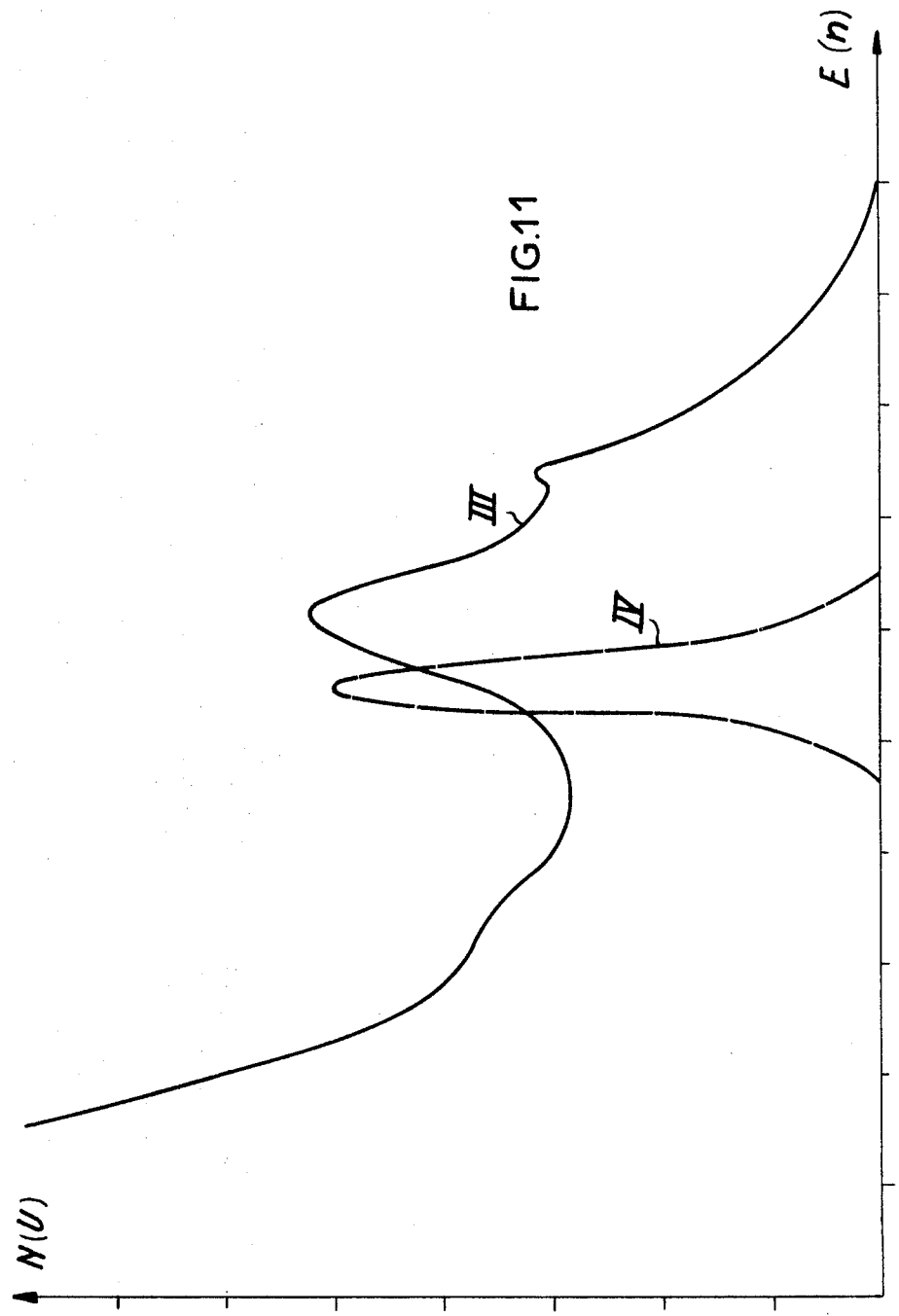

FIGS. 10 and 11 are graphs representing neutron spectra which have the form $N=F(E)$, the count N being expressed in arbitrary units U and the energy E being expressed in mev. or as a serial number of the channel which is being utilized.

FIG. 10 has been obtained by means of a source of the plutonium-beryllium type and a scintillator consisting of caesium iodide which is thallium-activated by the recoil proton method in a very thin hydrogenated diffuser (polyethylene).

Curve 1 has been obtained without utilizing the selection method in accordance with the invention while curve II has been established by eliminating the pulses which result from $\gamma$-rays. It will be apparent that narrow resonance peaks are observed by means of the method and devices of the invention and that the curves obtained contain a substantial number of details which are indiscernible when conventional detection methods are employed.

FIG. 11 comprises two spectra obtained from sources ($Pu=\alpha=Be$)+(Pu 239), the scintillator being of the same type as previously mentioned. However, it should be noted that the number M of the channels towards which the pulses are directed has been plotted on the x-axis.

Spectrum III has been established without effecting a selection of the incident pulses and corresponds to the reception of pulses resulting from $\alpha$- and $\gamma$-rays.

Spectrum IV was established by using pulse decay rate sensitive device and corresponds to the $\alpha$-ray pulses (Pu 239). The pulse decay rate sensitive device eliminates the $\gamma$ spectrum relative to the source ($Pu=\alpha=Be$). In order to increase the legibility of FIG. 11, the ordinates of the spectrum have been multiplied by ten.

What I claim is:

1. Unit for discriminating the shape of pulses of a given type in a sequence of incident pulses of identical polarity having one of a number of predetermined rates of decay, said unit consisting of a radiation detecting device, a coincidence circuit, a first pulse decay rate sensitive device which is coupled to one of the inputs of the coincidence circuit so as to deliver a signal each time an incident pulse has a decay rate which is lower than that of the wanted pulses, an anticoincidence circuit controlled by a second pulse decay rate sensitive device which delivers a signal each time an incident pulse has a decay rate which is higher than that of the wanted pulses, and a receiver.

2. Pulse shape discrimination unit as claimed in claim 1, wherein the channel which transmits the pulses derived from the detector is coupled to one of the inputs of the coincidence circuit by means of a pulse decay rate sensitive device of the first type to the other input of the coincidence circuit by way of a delay line.

3. Pulse shape discrimination unit as described in claim 2, wherein the channel which transmits the pulses derived from the detector is coupled to one of the inputs of an anticoincidence circuit by means of a pulse decay rate sensitive device of the second type to the second discriminator and to the other input of said anticoincidence circuit by way of a delay line.

4. Pulse shape discrimination unit comprising a radiation detecting device which comprises a photo-multiplier, a coincidence circuit, a first pulse decay rate sensitive device which is coupled to one of the inputs of the coincidence circuit so as to deliver a signal each time an incident pulse has a decay rate which is lower than that of the wanted pulses, an anticoincidence circuit controlled by a second pulse decay rate sensitive device which delivers a signal each time an incident pulse has a decay rate which is higher than that of the wanted pulses, and a receiver, wherein each pulse decay rate sensitive device comprises a channel for transmitting the incident pulses to a mixer after reversal of their polarity and a second channel for producing the auxiliary square wave which is also coupled with said mixer.

5. Pulse shape discrimination unit as described in claim 4 wherein the channel which produces the auxiliary square wave is constituted by the combination of two chains in parallel, wherein the first chain consists of a lengthening circuit for producing a step whose amplitude defines that of the square wave which supplies a gate coupled with the mixer, and the second chain consists of a differentiator and a monostable multivibrator which defines the duration of the auxiliary square wave and controls the gate of said first chain.

6. Pulse shape discrimination unit comprising a detecting device which comprises a radiation detector, coincidence circuit, a first pulse decay rate sensitive device which is coupled to one of the inputs of the coincidence circuit so as to deliver a signal each time an incident pulse has a decay rate which is lower than that of the wanted pulses, an anticoincidence circuit controlled by a second pulse decay rate sensitive device which delivers a signal each time an incident pulse has a decay rate which is higher than that of the wanted pulses, and a receiver, wherein each pulse decay rate sensitive device comprises a channel for transmitting the incident pulses to a mixer after reversal of their polarity and a second channel for producing the auxiliary square wave which is also coupled with said mixer.

References Cited

UNITED STATES PATENTS

| 2,910,592 | 10/1959 | Armistead | 250—71.5 |
| 3,278,753 | 10/1966 | Pitts et al. | 307—231 |

RALPH G. NILSON, Primary Examiner

M. J. FROME, Assistant Examiner

U.S. Cl. X.R.

250—83.3; 307—231; 328—92, 114; 329—104